(12) United States Patent
Edmond

(10) Patent No.: US 6,336,736 B1
(45) Date of Patent: Jan. 8, 2002

(54) ILLUMINATED BICYCLE FRAME APPARATUS

(76) Inventor: Jessica Edmond, 22512 Lake Shore Dr., Richton Park, IL (US) 60471

(*) Notice: Subject to any disclaimer, the term of this patent is extended or adjusted under 35 U.S.C. 154(b) by 0 days.

(21) Appl. No.: 09/519,759

(22) Filed: Mar. 6, 2000

(51) Int. Cl.[7] .............................. B62J 6/00; F21V 33/00
(52) U.S. Cl. ........................ 362/473; 362/551; 362/541
(58) Field of Search .................. 362/541, 473–476, 362/551, 183, 20; 385/147

(56) References Cited

U.S. PATENT DOCUMENTS 4,871,042 A * 10/1989 Hsu et al. .................... 180/220
4,901,209 A * 2/1990 Nitz ............................ 362/473

* cited by examiner

Primary Examiner—Sandra O'Shea
Assistant Examiner—Bao Q. Truong

(57) ABSTRACT

An illuminated bicycle frame apparatus for increasing the visibility of a bicycle frame. The illuminated bicycle frame apparatus includes a bike frame. The bike frame is generally hollow and generally translucent. An illumination system includes a plurality of lights mounted in the frame. A power source powers the plurality of lights. The power source is operationally coupled to each of the plurality of lights. The power source is a plurality of solar panels mounted on the bike frame.

17 Claims, 3 Drawing Sheets

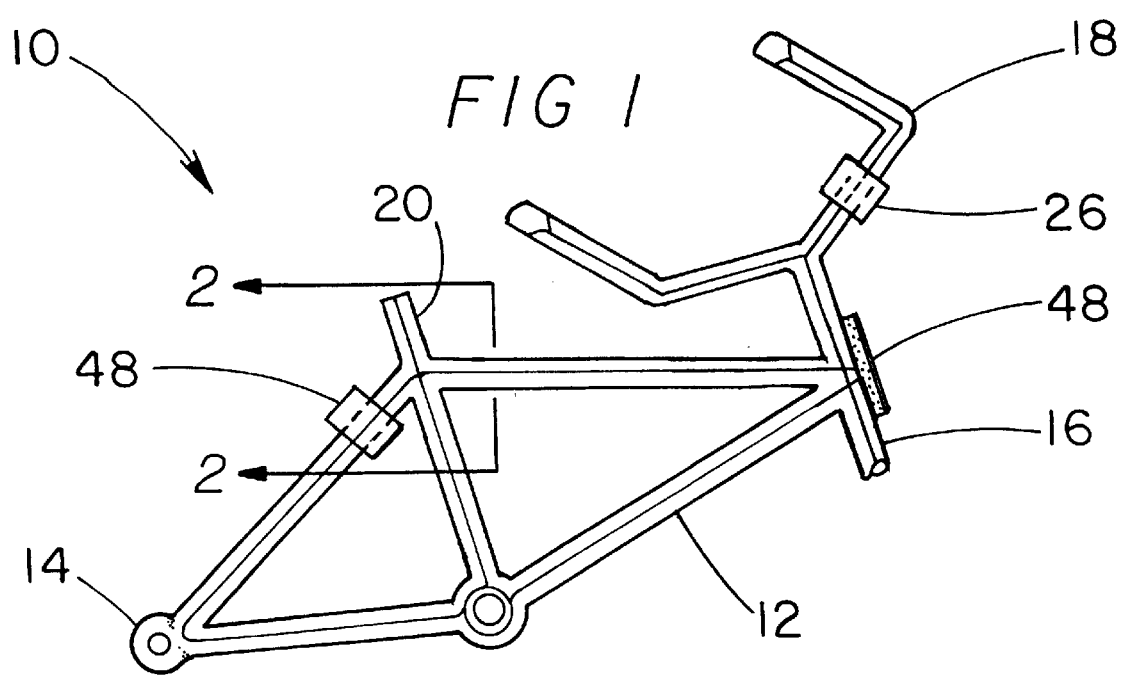
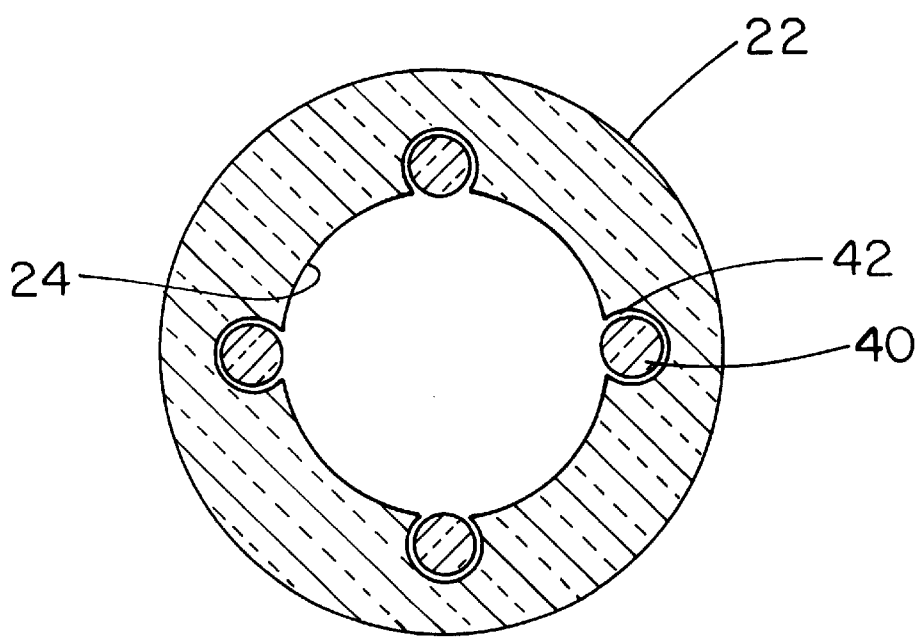

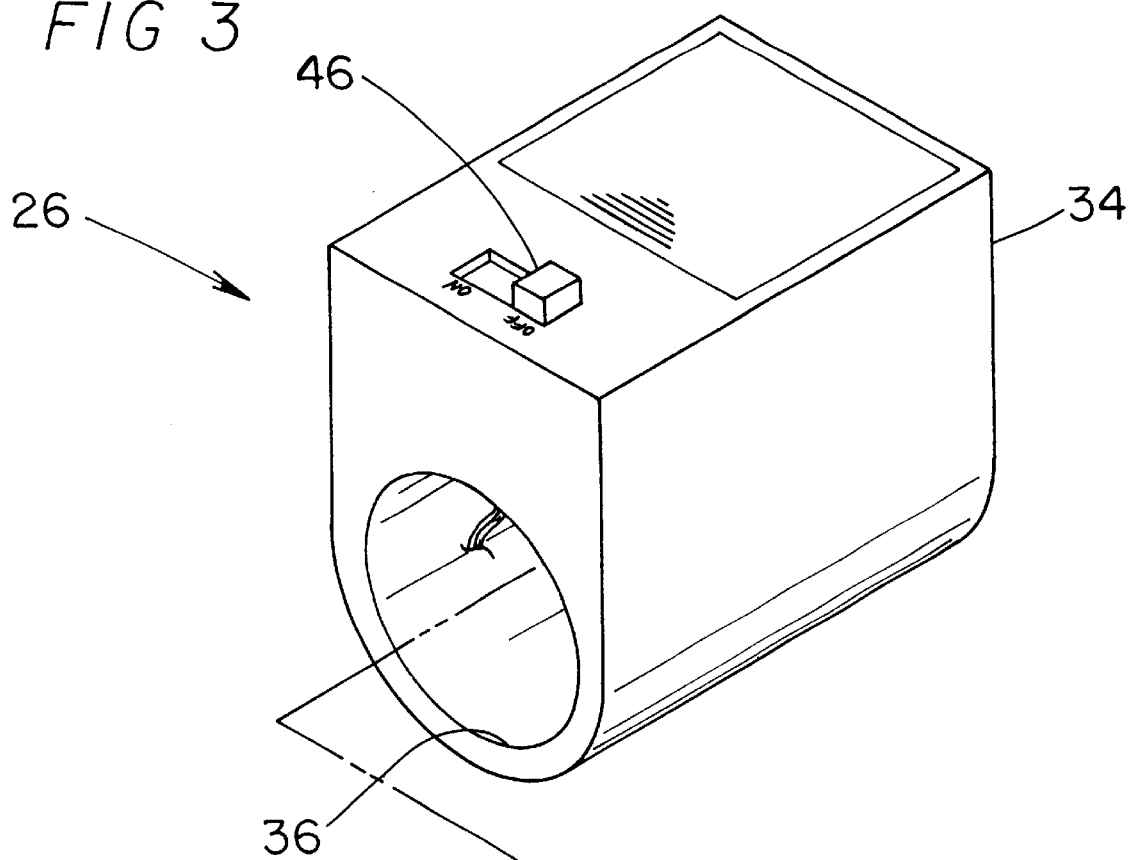
FIG 3
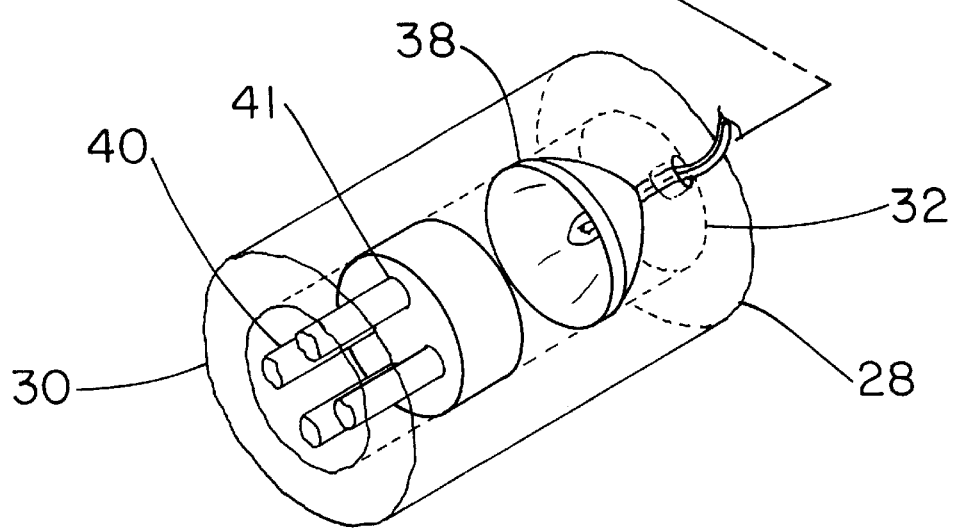

ILLUMINATED BICYCLE FRAME APPARATUS

BACKGROUND OF THE INVENTION

1. Field of the Invention

The present invention relates to bicycle illumination devices and more particularly pertains to a new illuminated bicycle frame apparatus for increasing the visibility of a bicycle frame.

2. Description of the Prior Art

The use of bicycle illumination devices is known in the prior art. More specifically, bicycle illumination devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,446,628; U.S. Pat. No. 5,008,782; U.S. Pat. No. 4,901,209; U.S. Pat. No. 5,379,197; U.S. Pat. No. 4,319,307; and U.S. Des. Pat. No. 360,957.

While these devices fulfill their respective, particular objectives and requirements, the aforementioned patents do not disclose a new illuminated bicycle frame apparatus. The inventive device includes a bike frame. The bike frame is generally hollow and generally translucent. An illumination system includes a plurality of lights mounted in the frame. A power source powers the plurality of lights. The power source is operationally coupled to each of the plurality of lights. The power source is a plurality of solar panels mounted on the bike frame.

In these respects, the illuminated bicycle frame apparatus according to the present invention substantially departs from the conventional concepts and designs of the prior art, and in so doing provides an apparatus primarily developed for the purpose of increasing the visibility of a bicycle frame.

SUMMARY OF THE INVENTION

In view of the foregoing disadvantages inherent in the known types of bicycle illumination devices now present in the prior art, the present invention provides a new illuminated bicycle frame apparatus construction wherein the same can be utilized for increasing the visibility of a bicycle frame.

The general purpose of the present invention, which will be described subsequently in greater detail, is to provide a new illuminated bicycle frame apparatus and method which has many of the advantages of the bicycle illumination devices mentioned heretofore and many novel features that result in a new illuminated bicycle frame apparatus which is not anticipated, rendered obvious, suggested, or even implied by any of the prior art bicycle illumination devices, either alone or in any combination thereof.

To attain this, the present invention generally comprises a bike frame. The bike frame is generally hollow and generally translucent. An illumination system includes a plurality of lights mounted in the frame. A power source powers the plurality of lights. The power source is operationally coupled to each of the plurality of lights. The power source is a plurality of solar panels mounted on the bike frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminated bicycle frame apparatus apparatus and method which has many of the advantages of the bicycle illumination devices mentioned heretofore and many novel features that result in a new illuminated bicycle frame apparatus which is not anticipated, rendered obvious, suggested, or even implied by any of the prior art bicycle illumination devices, either alone or in any combination thereof.

It is another object of the present invention to provide a new illuminated bicycle frame apparatus which may be easily and efficiently manufactured and marketed.

It is a further object of the present invention to provide a new illuminated bicycle frame apparatus which is of a durable and reliable construction.

An even further object of the present invention is to provide a new illuminated bicycle frame apparatus which is susceptible of a low cost of manufacture with regard to both materials and labor, and which accordingly is then susceptible of low prices of sale to the consuming public, thereby making such illuminated bicycle frame apparatus economically available to the buying public.

Still yet another object of the present invention is to provide a new illuminated bicycle frame apparatus which provides in the apparatuses and methods for the prior art some of the advantages thereof, while simultaneously overcoming some of the disadvantages normally associated therewith.

Still another object of the present invention is to provide a new illuminated bicycle frame apparatus for increasing the visibility of a bicycle frame.

Yet another object of the present invention is to provide a new illuminated bicycle frame apparatus which includes a bike frame. The bike frame is generally hollow and generally translucent. An illumination system includes a plurality of lights mounted in the frame. A power source powers the plurality of lights. The power source is operationally coupled to each of the plurality of lights. The power source is a plurality of solar panels mounted on the bike frame.

Still yet another object of the present invention is to provide a new illuminated bicycle frame apparatus that may use battery power as a power source when light is not sufficient to utilize the solar panels.

These together with other objects of the present invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive manner in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new illuminated bicycle frame apparatus according to the present invention.

FIG. 2 is a schematic cross-section view taken along line 2—2 of the present invention.

FIG. 3 is a schematic perspective view of the illumination system of the present invention.

DESCRIPTION OF THE PREFERRED EMBODIMENT

Figure 4:
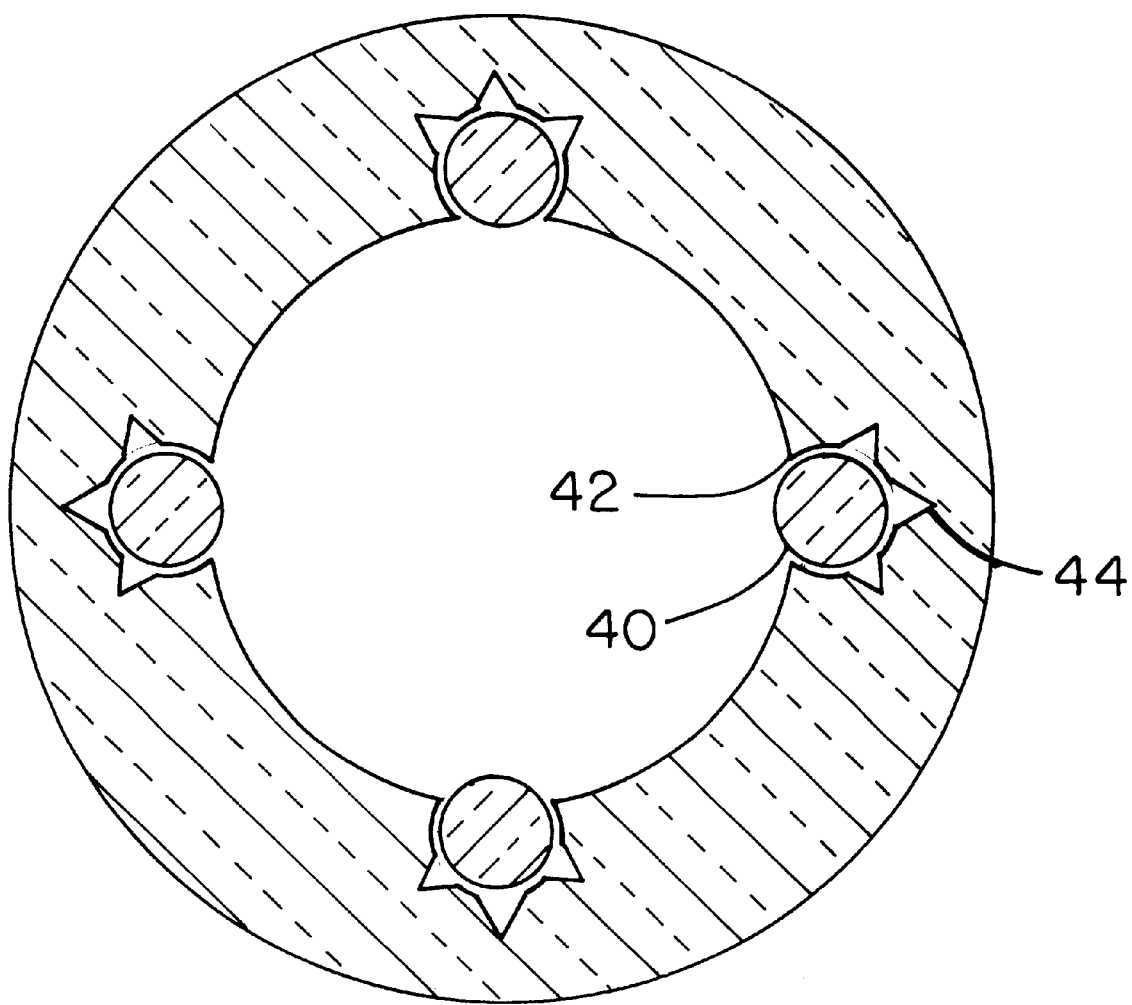
FIG. 4 is a schematic cross-sectional view of the present invention.

With reference now to the drawings, and in particular to FIGS. 1 through 4 thereof, a new illuminated bicycle frame apparatus embodying the principles and concepts to the present invention and generally designated by the reference numeral 10 will be described.

As best illustrated in FIGS. 1 through 4, the illuminated bicycle frame apparatus 10 generally comprises a bike frame 12. The bike frame is generally hollow. The bike frame has a distal portion 14 and a proximal portion 16 and includes a plurality of bars. The bike frame 12 has a handle bar portion 18, which is rotatably coupled to the proximal portion 16. A seat mounting bar portion 20 is positioned generally between the proximal portion 16 and the distal portion 14. Each of the bars has a peripheral wall 22, is generally hollow and has an inside surface 24. The bike frame 12 is translucent, and is ideally made from a rigid plastic.

A fiber optic illumination system 26 includes a fiber optic light canal 28. The fiber optic light canal 28 has a front side 30 and a back side 32. The fiber optic canal 28 is mounted in the handle bar portion 18.

A housing holds 34 the fiber optic light canal 28. The housing 34 has a bore 36 therethrough for passage of the handle bar. The fiber optic light canal 28 is generally positioned in the bore 36.

A light 38 is mounted in the back side 32 of the fiber optic light canal 28 such that the light is directed toward the front side 30 of the fiber optic light canal 28.

A plurality of fiber optic cables 40 each has opposite ends. A first 41 of the ends is positioned in the light canal 28, and a length of each of the cables 40 is positioned in the interior surface 24 of the peripheral wall 22 of the bars of the frame 12. The interior surface 24 of the peripheral walls 22 of the bars has fiber optic cable receiving corridors 42 therein. In the preferred embodiment, depicted in FIG. 4, the corridors 42 have grooves 44 therein for dispersing light.

An actuating means 46 turns the light 38 on and off. The actuating means 46 is mounted in a surface of the housing 34 and is operationally coupled to the light 38. The actuating means is a switch.

A power source powers the light. The power source is operationally coupled to the actuating means 46. The power source is a battery, not shown, which is mounted in the housing.

An auxiliary power source comprises a plurality of solar panels 48 fixedly mounted on the distal portion 14 and the proximal portion 16 of the frame 12. Each of the solar panels 48 is operationally coupled to the actuating means 46. The solar panels 48 can be adapted to recharge the battery or be the primary source of power.

In use, the user of the frame simply turns the light 38 on when the user feels an illuminated bike would be safer. The fiber optic cables 40 draw light throughout the frame 12 and make the frame very visible from all angles.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

I claim:

1. An illuminated bicycle frame apparatus, said apparatus comprising:
    a bike frame comprising a plurality of tubes having generally hollow interiors, said tubes each having a perimeter wall with an interior surface, the perimeter walls of said tubes of said bike frame being generally translucent;
    an illumination system comprising;
        a plurality of light emitting members mounted in said frame and each comprising a fiber optic cable;
    wherein the interior surface of said peripheral walls of at least one of said tubes having at least one fiber optic cable receiving corridor formed therein and extending in a longitudinal direction of said at least one tube, said at least one fiber optic receiving corridor having one of said fiber optic cables positioned therein.

2. The illuminated bicycle frame apparatus as in claim 1, wherein said bike frame has a distal portion and a proximal portion, said bike frame including a handle bar being rotatably coupled to said proximal portion, said bike frame having a seat mounting bar being positioned generally between said proximal portion and said distal portion.

3. The illuminated bicycle frame apparatus as in claim 2, wherein said illumination system includes
   a fiber optic cable illumination system comprising;
      a fiber optic light canal having a front side and a back side;
      a housing for holding said fiber optic light canal, said housing having a bore therethrough for passage of said handle bar, said fiber optic light canal being generally positioned in said bore;
      a light source being mounted in said back side of said fiber optic light canal such that said light is directed toward said front side of said fiber optic light canal; and
      wherein each of said fiber optic cables has opposite ends, a first of said ends being positioned in said light canal.

4. The illuminated bicycle frame apparatus as in claim 1, additionally comprising
   a power source for powering said illumination system, said power source being operationally coupled to each of said plurality of light emitting members, said power source comprising a plurality of solar panels mounted on said bike frame.

5. The illuminated bicycle frame apparatus as in claim 3, further comprising:
   an actuating means for turning said light source on and off, said actuating means being mounted in a surface of said housing, said actuating means being operationally coupled to said light source.

6. The illuminated bicycle frame apparatus as in claim 5, further comprising:
   a second power source for powering said illumination system, said second power source being operationally coupled to said actuating means, said second power source being a battery, said battery being mounted in said housing.

7. The illuminated bicycle frame apparatus as in claim 1, wherein said at least one corridor has longitudinal grooves formed therein for dispersing light from said at least one corridor.

8. The illuminated bicycle frame apparatus as in claim 1, wherein said at least one tube has four of said corridors formed therein.

9. The illuminated bicycle frame apparatus as in claim 8, wherein said four corridors are substantially equally spaced on the interior surface of said perimeter wall.

10. The illuminated bicycle frame apparatus as in claim 1, wherein each of said corridors has an opening into the interior of said tube, and wherein the opening is defined by a pair of spaced edges on the interior surface of said tube, and wherein a distance between said spaced edges is less than a diameter of said fiber optic cable such that a fiber optic cable positioned in said corridor is prevented from moving into the interior of said tube.

11. The illuminated bicycle frame apparatus as in claim 1, wherein the perimeter walls of said tubes of said bike frame comprise a rigid plastic material.

12. An illuminated bicycle frame apparatus comprising
   a bike frame comprising a plurality of tubes having generally hollow interiors, said tubes each having a perimeter wall with an interior surface, the perimeter walls of said tubes of said bike frame being generally translucent;
   an illumination system comprising;
      a plurality of light emitting members mounted in said frame and each comprising a fiber optic cable;
      wherein the interior surface of said peripheral walls of at least one of said tubes having at least one fiber optic cable receiving corridor formed therein and extending in a longitudinal direction of said at least one tube, said at least one fiber optic receiving corridor having one of said fiber optic cables positioned therein;
      wherein said at least one corridor has longitudinal grooves formed therein for dispersing light from said at least one corridor.
      wherein said at least one tube has four of said corridors formed therein;
      wherein said four corridors are substantially equally spaced on the interior surface of said perimeter wall;
      wherein each of said corridors has an opening into the interior of said tube, and wherein the opening is defined by a pair of spaced edges on the interior surface of said tube, and wherein a distance between said spaced edges is less than a diameter of said fiber optic cable such that a fiber optic cable positioned in said corridor is prevented from moving into the interior of said tube; and
      wherein the perimeter walls of said tubes of said bike frame comprise a rigid plastic material.

13. The illuminated bicycle frame apparatus as in claim 1, wherein said bike frame has a distal portion and a proximal portion, said bike frame including a handle bar being rotatably coupled to said proximal position, said bike frame having a seat mounting bar being positioned generally between said proximal portion and said distal portion.

14. The illuminated bicycle frame apparatus as in claim 13 wherein said illumination system includes a fiber optic cable illumination system comprising:
   a fiber optic light canal having a front side and a back side;
   a housing for holding said fiber optic light canal, said housing having a bore therethrough for passage of said handle bar, said fiber optic light canal being generally positioned in said bore;
   a light source being mounted in said back side of said fiber optic light canal such that said light is directed toward said front side of said fiber optic light canal; and
   wherein each of said fiber optic cables has opposite ends, a first of said ends being positioned in said light canal.

15. The illuminated bicycle frame apparatus as in claim 14 additionally comprising a power source for powering said illumination system, said power source being operationally coupled to each of said plurality of light emitting members, said power source comprising a plurality of solar panels mounted on said bike frame.

16. The illuminated bicycle frame apparatus as in claim 15 additionally comprising an actuating means for turning said light source on and off, said actuating means being mounted in a surface of said housing, said actuating means being operationally coupled to said light source.

17. The illuminated bicycle frame apparatus as in claim 16 additionally comprising a second power source for powering said illumination system, said second power source being operationally coupled to said actuating means, said second power source being a battery, said battery being mounted in said housing.

\* \* \* \* \*